(12) United States Patent
Chen

(10) Patent No.: US 11,231,880 B2
(45) Date of Patent: Jan. 25, 2022

(54) DATA STORAGE DEVICE CAPABLE OF SELF-ACCESSING DATA FILE

(71) Applicant: INNODISK CORPORATION, New Taipei (TW)

(72) Inventor: Ming-Sheng Chen, New Taipei (TW)

(73) Assignee: Innodisk Corporation, New Taipei (TW)

( * ) Notice: Subject to any disclaimer, the term of this patent is extended or adjusted under 35 U.S.C. 154(b) by 0 days.

(21) Appl. No.: 16/835,817

(22) Filed: Mar. 31, 2020

(65) Prior Publication Data

US 2021/0141563 A1   May 13, 2021

(30) Foreign Application Priority Data

Nov. 11, 2019 (TW) .................................. 108140888

(51) Int. Cl.
*G06F 3/06* (2006.01)
*G06F 9/4401* (2018.01)
*G06F 11/07* (2006.01)

(52) U.S. Cl.
CPC .......... *G06F 3/0659* (2013.01); *G06F 3/0605* (2013.01); *G06F 3/067* (2013.01); *G06F 3/0658* (2013.01); *G06F 3/0683* (2013.01); *G06F 9/4411* (2013.01)

(58) Field of Classification Search
USPC ..... 707/821–827, 674–686; 714/10, 11, 38.1
See application file for complete search history.

(56) References Cited

U.S. PATENT DOCUMENTS

| | | | |
|---|---|---|---|
| 2008/0250172 A1* | 10/2008 | Tanaka ................. | G06F 3/0634 710/63 |
| 2009/0210621 A1* | 8/2009 | Honda ............... | H04N 1/00315 711/115 |
| 2011/0078375 A1* | 3/2011 | Shepherd ............. | G06F 3/0632 711/115 |
| 2016/0306795 A1* | 10/2016 | Ford ................... | G06F 16/1827 |
| 2021/0072907 A1* | 3/2021 | Li ........................ | G06F 3/0635 |

\* cited by examiner

*Primary Examiner* — Ilwoo Park
(74) *Attorney, Agent, or Firm* — Rosenberg, Klein & Lee

(57) ABSTRACT

The invention provides a data storage device capable of self-accessing data file, which comprises a data storage unit and a microprocessor. The data storage unit includes a controller and a plurality of flash memories. The microprocessor is provided with an operating system, and is connected to the data storage unit through a data transmission interface. The operating system is configured with a file system, and a driver program of the data transmission interface. The operating system of the microprocessor performs a data access operation to the data storage unit via the driver program to obtain a raw data. Then, the file system in the operating system performs a file parsing process to the raw data to parse out a file information of the raw data. Accordingly, the data storage device is capable of self-accessing the data file of the flash memories by the operating system configured in the microprocessor.

9 Claims, 3 Drawing Sheets

DATA STORAGE DEVICE CAPABLE OF SELF-ACCESSING DATA FILE

This non-provisional application claims priority claim under 35 U.S.C. § 119(a) on Taiwan Patent Application No. 108140888 filed Nov. 11, 2019, the entire contents of which are incorporated herein by reference.

FIELD OF THE INVENTION

The present invention relates to a data storage device, a data storage device capable of self-accessing data file.

BACKGROUND

With the need for data storage, a data storage data, for example, Solid State Drive (SSD), often used by a host to store important data. Referring to FIG. 1, there is shown a circuit architecture diagram of a conventional data storage device. As shown in FIG. 1, the data storage device 10 comprises a controller 11, a plurality of flash memories 13, and a data transmission interface 15. The controller 11 is connected to the flash memories 13, and the data transmission interface 15.

The data storage device 10 is connected to a host 20 via the data transmission interface 15. The data transmission interface 15 is a data transmission interface of standard specification, for example, SATA or PCIe, commonly used in an operating system. When an operating system 21 of the host 20 wants to access data for the data storage device 10, it will send an access command, for example, read/write command, to the data storage device 10 via a driver program of data transmission interface, for example, SATA or PCIe driver program. The controller 11 of the data storage device 10 can access data for the flash memories 13 after receiving the access command.

The operating system 21 of the host 20 is usually configured with a file system 22 that is a subsystem of the operating system. The file system 22 stores data to the data storage device 10 in a file form, or read data from the data storage device 10 in the file form. When the operating system 21 of the host 20 accesses data for the data storage device 10, the accessed data is a raw data. The operating system 21 perform a file analysis for the raw data accessed via the file system 22, for example, the file system 22 analyzes a file name, a file type, or a file attribute of the raw data, thereby the raw data analyzed can be managed or operated by the operating system 21.

Besides, the controller 11 of the conventional data storage device 10 is usually not provided with any operating system, and therefore it can only access the raw data, and can't further perform the file analysis for the raw data accessed. Further, a data transmission interface between the controller 11 and the flash memories 13 is a specific standard specification interface (such as SPI, I2C, or UART) that is not commonly used in the operating system. If the controller 11 of the data storage device 10 is provided with an operating system, engineer needed to additionally write and configure a driver program of the specific standard specification interface in the file system of the operating system in order to allow that the file system of the operating system analyzes the file information of data transmitted between the controller 11 and the flash memories 13, such a way that is not only complicated but also the access efficiency is very low.

SUMMARY

It is one objective of the present invention to provide a data storage device capable of self-accessing data file. The data storage device comprises a data storage unit and a microprocessor having an operating system. The data storage unit comprises a controller and a plurality of flash memories. The data storage device is capable of accessing data in the flash memories, and performs a file parsing procedure to the data accessed from the flash memories, such that the data storage device can arrive the objective of self-accessing the data file.

It is another objective of the present invention to provide a data storage device capable of self-accessing data file, in which the data storage device is connected to a host. An operating system of the host can access data stored in the flash memories of the data storage device. When the operating system is abnormal, a manager of a cloud management platform perform a repairing operation to the operating system of the host by an operating system configured in the microprocessor of the data storage device, so that the operating system of the host repaired can be restarted and resume normal operation, again.

It is another objective of the present invention to provide a data storage device capable of self-accessing data file, wherein the microprocessor of the data storage device is connected to the data storage unit via a high-speed data transmission interface to access data stored in the data storage unit at high-speed.

To achieve the above objective, a data storage device, comprising: a data storage unit comprising a controller and a plurality of flash memories connected to the controller; and a microprocessor, provided with a first operating system, and connected to the data storage unit via a high-speed data transmission interface; wherein a data is transmitted between the data storage unit and the microprocessor via the high-speed data transmission interface, the first operating system comprises a first file system, the first file system is configured with a driver program of the high-speed data transmission interface; wherein the first operating system of the microprocessor performs a data access operation for the data storage unit via the driver program to obtain a raw data, the first file system of the first operating system performs a file parsing process for the raw data to parse out a file information of the raw data.

In one embodiment of the present invention, further comprising a switcher configured in channels of the high-speed data transmission interface, the microprocessor or the controller controls a switching of the switcher to conduct the channels of the high-speed data transmission interface between the data storage unit and the microprocessor, or conduct the channels of the high-speed data transmission interface between the data storage unit and a host; wherein the host is provided with a second operating system, the second operating system comprises a second file system, the second file system is configured with the driver program of the high-speed data transmission interface; when the channels of the high-speed data transmission interface between the data storage unit and the host has conducted, the second operating system of the host performs the data access operation for the data storage unit via the driver program to obtain the raw data, the second file system of the second operating system performs the file parsing process for the raw data to parse out the file information of the raw data.

In one embodiment of the present invention, when the microprocessor or the controller sends a first level signal to the switcher, the channels of the high-speed transmission interface between the data storage unit and the host will be conducted; when the microprocessor or the controller sends a second level signal to the switcher, the channels of the high-speed transmission interface between the data storage unit and the microprocessor will be conducted.

In one embodiment of the present invention, wherein the first operating system is an embedded operating system.

In one embodiment of the present invention, wherein the first file system is a file system in a form of FAT, NTFS, or exFAT.

In one embodiment of the present invention, wherein the high-speed data transmission interface is a data transmission interface conforming to SATA or PCIe standard specification.

In one embodiment of the present invention, wherein the switcher is a channel switcher of a SATA data transmission interface or a PCIe data transmission interface.

In one embodiment of the present invention, wherein the data storage device comprises a network communication component, the microprocessor of the data storage device is connected to a management platform via the network communication element; when the management platform sends a data access request to the data storage device, the first operating system of the microprocessor sends a corresponding data access command to the controller according to the data access request via the driver program, obtains the raw data related to the data access request in a process of performing of the data access command, and performs the file parsing process for the raw data related to the data access request via the first file system to parse out the file information of the raw data.

In one embodiment of the present invention, wherein the network communication component is a WiFi communication component, an Ethernet communication component, or a 4G or 5G communication component.

In one embodiment of the present invention, wherein the data storage device comprises a network communication component, the microprocessor of the data storage device is connected to a management platform via the network communication element, the data storage device is connected to a host via the high-speed data transmission interface, the host is provided with a second operating system in the flash memories of the data storage unit of the data storage device, the second operating system comprises a second file system, the second file system is configured with the driver program of the high-speed data transmission interface; when the second operating system of the host has been damaged, the management platform sends a data access request for repairing the second operating system to the data storage device, the data access request includes the raw data for restoring the second operating system; then, when the data storage device receives the data access request, the first operating system of the microprocessor of the data storage device performs the file parsing process to the raw data of the data access request via the first file system to obtain a system restoring file, and sends a data access command for repairing the second operating system to the controller, such that the controller repairs the second operating system of the host stored in the flash memories by the system restoring file.

DETAILED DESCRIPTION OF THE PREFERRED EMBODIMENTS

Figure 1:
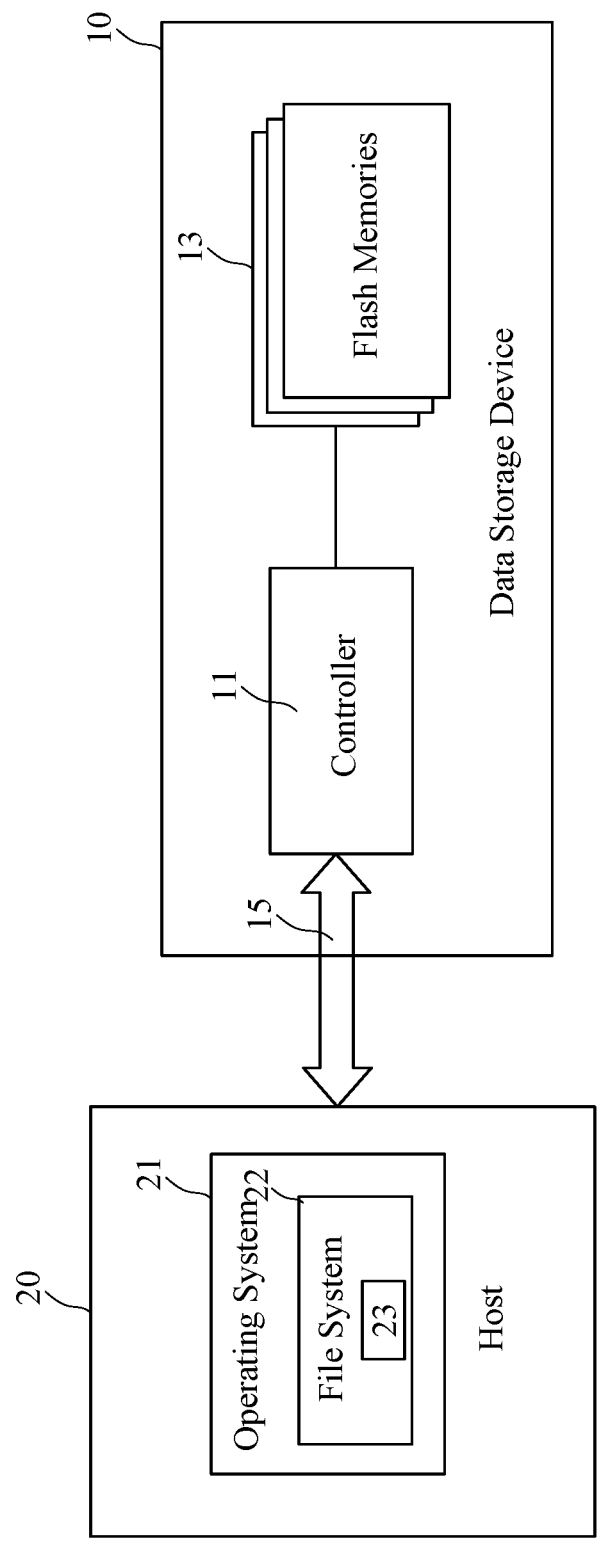
FIG. 1 is a circuit diagram of a conventional data storage device.
Figure 2:
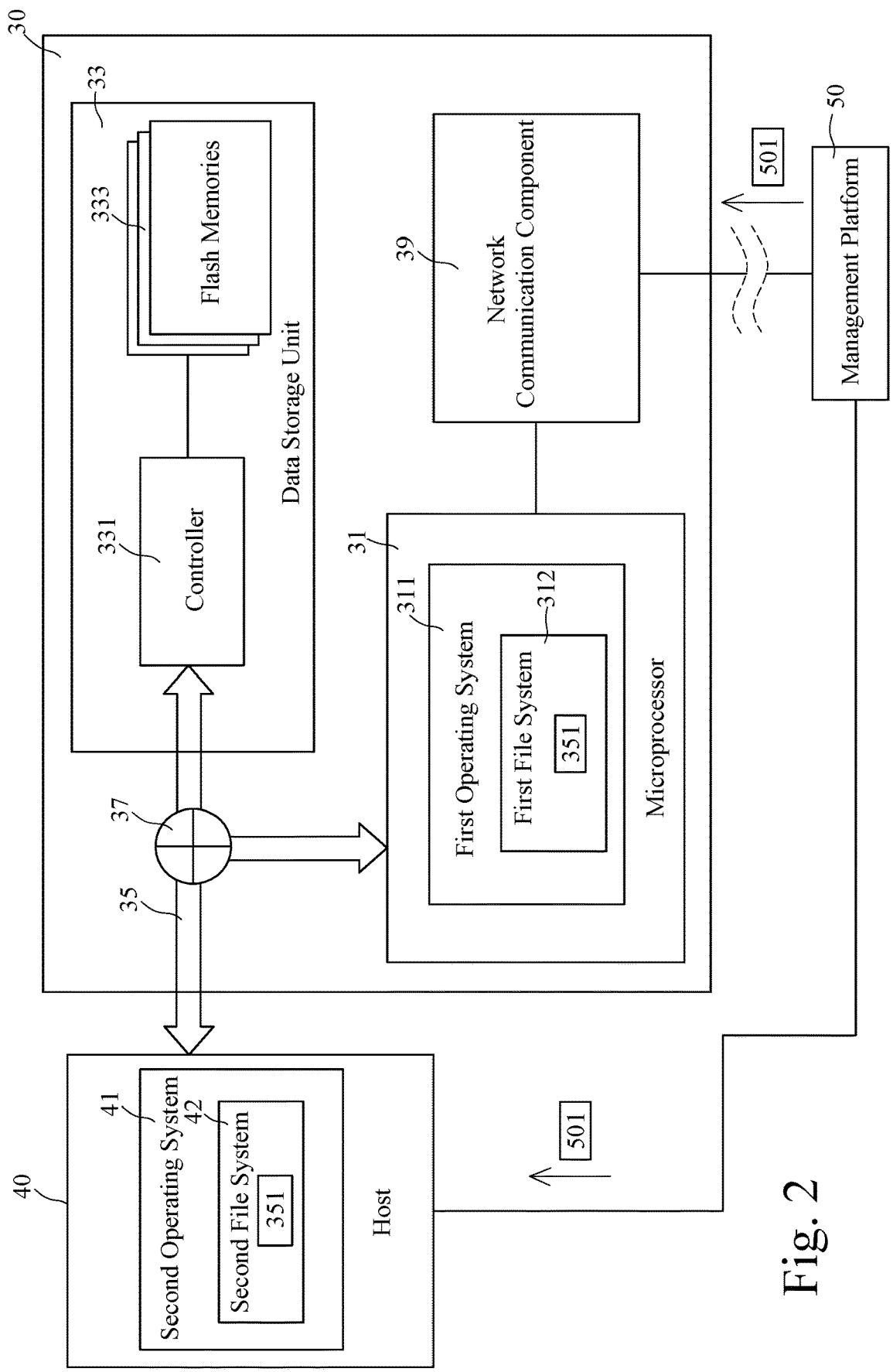
FIG. 2 is a circuit diagram of a data storage device of the present invention.

Referring to FIG. 2, there is shown a circuit diagram of a data storage device of the present invention. As shown in FIG. 2, the data storage device 30 may be a SSD (Solid State Disk), which comprises a microprocessor 31, a data storage unit 33, and a data transmission interface 35. The data storage unit 33 comprises a controller 331 and a plurality of flash memories 333. The controller 331 is connected to the flash memories 333 via a serial transmission interface, for example, SPI, I2C, or UART transmission interface. The microprocessor 31 is connected to the data storage unit 33 via the data transmission interface 35. The data transmission interface 35 of the present invention is a high-speed data transmission interface, for example, the data transmission interface conforming to SATA or PCIe standard specification, commonly used in an operating system.

The microprocessor 31 is provided with a first operating system 311. The first operating system 311 may be an embedded operating system, for example, Linux or RTOS-based operating system. The first operating system 311 includes a first file system 312 in form of FAT, NTFS, or exFAT. The first file system 312 is configured with a driver program 351 of the data transmission interface 35.

When the microprocessor 31 of the data storage device 30 receives an external data access request 501, the first operating system 311 of the microprocessor 31 issues a data access command (such as read or write command) to the controller 331 via the driver program 351. The controller 331 performs a data access operation for the flash memories 333 according to the data access command. In the operation process of the data access, the data transmission interface 35 will transmit a raw data related with the data access request 501 between the controller 331 and the microprocessor 31. The first file system 312 performs a file parsing process for the raw data to parse out a file information of the raw data, for example, a file name, a file type, or a file attribute of the raw data, and obtains a data file after parsing the raw data. Afterwards, the first operating system 311 can manage or control the raw data via the first file system 312 in the form of file.

The data storage device 30 further comprises a network communication component 39. The microprocessor 31 is connected to a management platform 50 via the network communication element 39. The management platform 50 may also be an intranet management platform or a cloud management platform. The network communication component 39 is a WiFi communication component, an Ethernet communication component, or a 4G or 5G communication component. The data access request 501 is issued by the management platform 50.

In one application embodiment of the present invention, the data access request 501 issued by the management platform 50 is an access request for updating system or firmware. The data access request 501 includes a raw data for updating system or firmware. When the microprocessor 31 of the data storage device 30 receives the data access request 501, the first operating system 311 of the microprocessor 31 parses a file information of the raw data in the data access request 501 via the first file system 312 to obtain a data file for updating system or firmware, and then sends a data access command for updating system or firmware to the controller 331 to update the system data or the firmware data stored in the data storage unit 33 by the data file for updating system or firmware.

In another application embodiment of the present invention, the data access request 501 issued by the management platform 50 is an access request for reading a health data of the data storage device 30. The health data of the data storage device 30 is used to indicate a service life of the data storage device 30. When the microprocessor 31 of the data storage device 30 receives the data access request 501, the first operating system 311 of the microprocessor 31 issues a read command for the health data to the controller 331 to read a raw health data from the flash memories 333, parses a file information of the raw health data via the first file system 312 to obtain a health data file, and transmits the health data file to the management platform 50 via the network communication component 39. During the controller 331 reads data from the flash memories 333 or writes data into the flash memories 333, the controller 331 records some health data of the data storage device 30, such as Raw Bit Error Rate (RBER), Program/Erase cycle (P/E cycle), average erase count, later bad block count, program fail count, unexpected power loss, etc., and these health data are recorded in the flash memories 333. Thus, a manager of the management platform 50 wants to know a health status of the data storage device 30, he can read a health data file from the flash memories 333 via the first operating system 311 of the microprocessor 31.

In another application embodiment of the present invention, the data access request 501 issued by the management platform 50 is an access request for performing a TRIN function. The TRIN function is a function configured in the data storage device 30, and it is capable for performing a garbage collection process in order to optimize an operation efficiency of the data storage device 30. When the microprocessor 31 of the data storage device 30 receives the data access request 501, the first operating system 311 of the microprocessor 31 activates the TRIN function of the data storage device 30, and issues a data access command of the TRIN function to the controller 331. The controller 331 performs the garbage collection process to data blocks of the flash memories 333 according to the data access command to erase invalid data stored in the data blocks, or move valid data stored in the data blocks into another blocks. In the garbage collection process, the first operating system 311 parses a file information of invalid data and valid data via the first file system 312 to effectively erase the file with invalid data, or gather and move the file with valid data to the consecutive data blocks. The access efficiency of the data storage device 30 can be improved by self-performing the TRIN function.

The embodiments in the above described are only partially implementation of the present invention. In actual application, the management platform 50 may issue a variety of data access requests 501 to the data storage device 30, such that the first operating system 311 of the microprocessor 31 of the data storage device 30 performs a specific operation according to the data access request 501, and parses a file information of the data accessed in the specific operation process via the first file system 312.

The data storage device 30 is further connected to a host 40 via the data transmission interface 35. The host 40 is a computer host having a network communication function, and connected to the management platform 50 via a way of the network. The host 40 is provided with a second operating system 41. The second operating system 41 is Windows system of Microsoft or Mac OS of Apple. The second operating system 41 includes a second file system 42 in a form of FAT, NTFS, or exFAT. Similarly, the second file system 42 may be also configured with the driver program 351 of the data transmission interface 35. In the present invention, the host 40 receives the data access request 501 issued by the management platform 50, and then the second operating system 41 of the host 40 performs a data access operation for the data storage unit 33 of the data storage device 30 according to the data access request 501.

Figure 3:
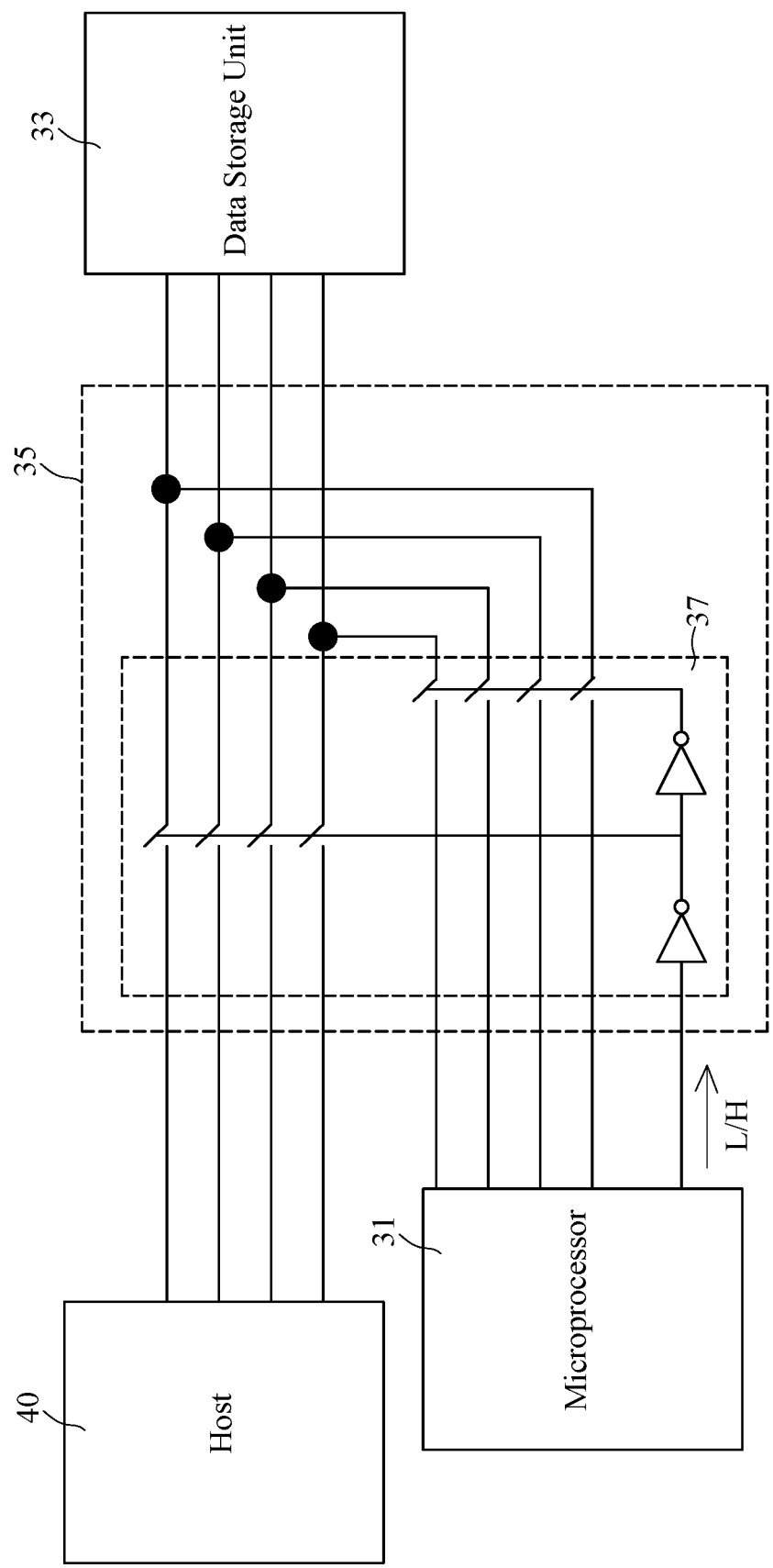
FIG. 3 is a schematic diagram representing a switching of channels on a data transmission interface of the data storage device of the present invention.

In one embodiment of the present invention, a switcher 37 is provided in channels of the data transmission interface 35. The switcher 37 is a channel switcher for a SATA data transmission interface or a PCIe data transmission interface. The microprocessor 31 controls a switching of the switcher 37 to determine that the data stored in the data storage unit 33 is accessed by the second operating system 41 of the host 40, or by the first operating system 311 of the microprocessor 31. As seen in FIG. 3, when the host 40 is operating normally, the microprocessor 31 sends a first level signal (L) to the switcher 37 so that the channels of the data transmission interface 35 between the data storage unit 33 and the host 40 can be conducted. When the channels of the data transmission interface 35 between the data storage unit 33 and the host 40 has conducted, the second operating system 41 of the host 40 sends a data access command to the controller 331 via the driver program 351 according to the data access request 501, and then the controller 331 performs a data access operation to the flash memories 333 according to the data access command. In the data access operation process, a raw data related to the data access request 501 will be transmitted on the data transmission interface 35 between the controller 331 and the host 40. The second file system 42 performs a file parsing process to the raw data to parse out a file information of the raw data, and further obtain a data file after parsing the raw data. Afterwards, the second operating system 41 can manage or control the raw data by the second file system 42 in the form of file. Accordingly, the second operating system 41 can perform the data access operation for the data storage unit 33 of the data storage device 30 based on the data access request 501 of a various of application embodiments.

In another embodiment of the present invention, the data storage device 30 is a master disk, the second operating system 41 of the host 40 is installed in the flash memories 333 of the data storage unit 33 of the data storage device 30. When the host 40 is abnormal, for example, the second operating system 41 of the host 40 has damaged, the data access operation for the data storage unit 33 will be taken over by the first operating system 311 of the microprocessor 31. The microprocessor 31 sends a second level signal (H) to the switcher 37 to conduct the channels of the data transmission interface 35 between the data storage unit 33 and the microprocessor 31. When the channels of the data transmission interface 35 between the data storage unit 33 and the microprocessor 31 has conducted, the first operating system 311 of the microprocessor 31 can perform the data access operation to the data storage unit 33 of the data storage device 30 according to the data access request 501. In one embodiment of the present invention, as shown in FIG. 3, the switching of the switcher 37 is determined by the microprocessor 31. In another embodiment of the present invention, the switching of the switcher 37 is determined by the controller 331, the controller 331 may send the first level signal (L) to the switcher 37 to conduct the channels of the data transmission interface 35 between the data storage unit 33 and the microprocessor 31, or send the second level signal (H) to the switcher 37 to conduct the channels of the data transmission interface 35 between the data storage unit 33 and the host 40.

Sequentially, when the second operating system 41 of the host 40 is abnormal, the management platform 50 sends a data access request 501 for repairing the second operating system 41, the data access request 501 includes a raw data of restoring the second operating system 41. When the microprocessor 31 of the data storage device 30 receives the data access request 501, the first operating system 311 of the microprocessor 31 parses a file information of the raw data of the data access request 501 via the first file system 312 to obtain a system restoring file, and sends a data access command for repairing the second operating system 41 to the controller 331. Then, the controller 331 can repair the second operating system 41 in the flash memories 333 of the data storage unit 33 by the system restoring file according to the data access command for repairing the second operating system 41. When the second operating system 41 of the host 40 has been repaired, the host 40 can be allowed to perform the data access operation to the data storage unit 33 of the data storage device 30, again. Further, the system restoring file is a large data file, the microprocessor 31 is connected to the controller 331 via the high-speed data transmission interface 35, in such a way that the controller 331 can quickly receive the system restore file transmitted by the microprocessor 31, and therefore repair the second operating system 41 in the flash memories 333 as soon as possible. Accordingly, the microprocessor 31 is connected to the data storage unit 33 via the high-speed data transmission interface 35 to access the data stored in the data storage unit 33 at high speed.

Summed up, the data storage device 30 of the present invention is additionally provided with a microprocessor 31 having an operating system 311. By the operating system 311 of the microprocessor 31, the data storage device 30 is capable of accessing the raw data in the flash memories 333, parses the file information of the raw data accessed from the flash memories 333, and obtains the data file after parsing the raw data, such that the data storage device can implement the objective of self-accessing the data file. Besides, when the operating system 41 of the host 40 is abnormal, the manager of the cloud management platform 50 can repair the operating system 41 of the host 40 via the operating system 311 of the microprocessor 312 of the data storage device 30 so that the operating system 41 of the host 40 can be restarted and resume normal operation, again.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A data storage device, comprising:
a data storage unit comprising a controller and a plurality of flash memories connected to the controller; and
a microprocessor, provided with a first operating system, and connected to the data storage unit via a high-speed data transmission interface; wherein a data is transmitted between the data storage unit and the microprocessor via the high-speed data transmission interface, the first operating system comprises a first file system, the first file system is configured with a driver program of the high-speed data transmission interface;
wherein the first operating system of the microprocessor performs a data access operation for the data storage unit via the driver program to obtain a raw data from the data storage unit, the first file system of the first operating system performs a file parsing process for the raw data from the data storage unit to parse out a file information of the raw data from the data storage unit;
wherein the data storage device comprises a network communication component, the microprocessor of the data storage device is connected to a management platform via the network communication element, the data storage device is connected to a host via the high-speed data transmission interface, the host is provided with a second operating system in the flash memories of the data storage unit of the data storage device, the second operating system comprises a second file system, the second file system is configured with the driver program of the high-speed data transmission interface; when the second operating system of the host has been damaged, the management platform sends a data access request for repairing the second operating system to the data storage device, the data access request includes a raw data used for restoring the second operating system; then, when the data storage device receives the data access request, the first operating system of the microprocessor of the data storage device performs the file parsing process to the raw data of the data access request via the first file system to obtain a system restoring file, and sends a data access command for repairing the second operating system to the controller, such that the controller repairs the second operating system of the host stored in the flash memories by the system restoring file.

2. The data storage device according to claim 1, further comprising a switcher configured in channels of the high-speed data transmission interface, the microprocessor or the controller controls a switching of the switcher to conduct the channels of the high-speed data transmission interface between the data storage unit and the microprocessor, or conduct the channels of the high-speed data transmission interface between the data storage unit and the host; when the channels of the high-speed data transmission interface between the data storage unit and the host has conducted by the switcher, the second operating system of the host performs the data access operation for the data storage unit via the driver program to obtain the raw data from the data storage unit, the second file system of the second operating system performs the file parsing process for the raw data from the data storage unit to parse out the file information of the raw data from the data storage unit.

3. The data storage device according to claim 2, when the microprocessor or the controller sends a first level signal to the switcher, the channels of the high-speed transmission interface between the data storage unit and the host will be conducted; when the microprocessor or the controller sends a second level signal to the switcher, the channels of the high-speed transmission interface between the data storage unit and the microprocessor will be conducted.

4. The data storage device according to claim 2, wherein the switcher is a channel switcher of a SATA data transmission interface or a PCIe data transmission interface.

5. The data storage device according to claim 1, wherein the first operating system is an embedded operating system.

6. The data storage device according to claim 1, wherein the first file system is a file system in a form of FAT, NTFS, or exFAT.

7. The data storage device according to claim 1, wherein the high-speed data transmission interface is a data transmission interface conforming to SATA or PCIe standard specification.

8. The data storage device according to claim 1, when the management platform sends a specific data access request to the data storage device, the first operating system of the microprocessor sends a corresponding data access command to the controller according to the specific data access request via the driver program, obtains the raw data related to the specific data access request in a process of performing the data access command, and performs the file parsing process for the raw data related to the specific data access request via the first file system to parse out the file information of the raw data related to the specific data access request.

9. The data storage device according to claim 1, wherein the network communication component is a WiFi communication component, an Ethernet communication component, or a 4G or 5G communication component.

* * * * *